United States Patent [19]

Mabie, Jr. et al.

[11] Patent Number: 4,548,381

[45] Date of Patent: Oct. 22, 1985

[54] CASTABLE RECEIVER

[75] Inventors: Curtis P. Mabie, Jr., Thurmont; Robert L. Busby, Gaithersburg; James A. Cliber, Wheaton, all of Md.

[73] Assignee: Solarex Corporation, Rockville, Md.

[21] Appl. No.: 647,432

[22] Filed: Sep. 5, 1984

[51] Int. Cl.$^4$ .............................. B29C 1/00; B28B 7/36
[52] U.S. Cl. .................................. 249/114 R; 249/134; 264/219; 264/337; 264/338; 156/82; 156/89
[58] Field of Search ................ 249/114, 134; 264/219, 264/337, 338, 85, 273; 156/82, 89, 182

[56] References Cited

U.S. PATENT DOCUMENTS

| | | | |
|---|---|---|---|
| 2,922,255 | 1/1960 | Broderick et al. | 249/134 X |
| 3,295,818 | 1/1967 | Kreier | 249/134 |
| 3,317,178 | 5/1967 | Kreier | 249/134 |
| 3,357,481 | 12/1967 | Snyder et al. | 249/114 X |
| 3,376,914 | 4/1968 | Emmott | 249/114 X |
| 3,673,293 | 6/1972 | Teague | 249/114 X |
| 3,911,994 | 10/1975 | Truman | 249/134 X |
| 3,973,750 | 8/1976 | Rabinovitch et al. | 249/114 |
| 4,031,046 | 6/1977 | Tisja | 264/219 X |
| 4,049,759 | 9/1977 | Florian | 249/114 X |
| 4,174,089 | 1/1979 | Kienow et al. | 249/134 X |
| 4,188,450 | 2/1980 | Greskovich | 249/134 X |
| 4,256,681 | 3/1981 | Lindmayer | 264/85 |
| 4,269,653 | 5/1981 | Wada et al. | 264/219 X |
| 4,362,686 | 12/1982 | Clishem et al. | 264/134 X |
| 4,380,421 | 4/1983 | Morris | 249/134 X |
| 4,383,959 | 5/1983 | Sadler | 264/219 X |
| 4,425,411 | 1/1984 | Textor et al. | 249/134 X |

Primary Examiner—J. Howard Flint, Jr.
Attorney, Agent, or Firm—Finnegan, Henderson, Farabow, Garrett & Dunner

[57] ABSTRACT

A receiver for casting molten material formed by the steps comprising forming a mixture comprising particulate ceramic powders and a binder; adding the mixture to a mold disposed to form board-like members and hardening the mixture; removing the hardened mixture from the mold; reducing the permeability of the board-like members, cementing the board-like members together to form a receiver and coating the receiver with release agents. Specifically, the receivers are used in the casting of high purity silicon for solar energy cells.

15 Claims, No Drawings

CASTABLE RECEIVER

This invention relates to a receiver for use in casting of molten material. More specifically this invention relates to a receiver which is used in the casting of high purity silicon.

BACKGROUND OF THE INVENTION

The casting of molten materials is usually carried out using ceramic apparatus, ceramic molds, or receivers and apparatus. The choice of receiver material is critical in the casting of high purity materials and particularly critical in the casting of high purity silicon. In order to produce a cast article having optimum characteristics, it is desirable to control the crystallization of silicon. Thus, a receiver material which has thermal expansion characteristics which closely match those of the cast material is desired. Use of such a receiver material reduces the application of stress to the partially solidified or solidified cast material due to differential thermal expansion between the casting and the receiver.

It is an object of the present invention to produce a receiver which can be used in the casting of high purity silicon bricks.

An additional object of the present invention is to produce recievers that have low permeability to the casting material, sufficient hot strength to withstand heavy loads, and relatively low thermal expansion characteristics so that interfacial stresses between the receiver and the cast article are minimized.

Still another object of the invention is to provide a receiver which retains its shape so that the cast article has dimensional consistency.

Still another object of the invention is to provide a receiver which will produce silicon bricks having highly columnar silicon crystal growth which will produce bricks having good electrical properties.

SUMMARY OF THE INVENTION

To achieve the foregoing objects and in accordance with the purposes of the invention as embodied and broadly described herein, the invention comprises a receiver for casting molten materials. The receiver is formed by first, forming a mixture comprising particulate ceramic powders and a binder. This mixture is then added to a mold disposed to form a board-like member and the mixture is allowed to harden. Once the mixture has hardened, the board-like members are removed from the mold and the surface of the board-like members are heated to reduce their permeability. The board-like members are then cemented together to form a receiver using a temperature resistant cement. Finally, the receiver is coated with release agents. Preferably the mixture comprises particulate ceramic powders having varying U.S. standard mesh sizes and a binder of ethyl-orthosilicate. The ceramic powders are preferably fused silica powders or quartz and may include potassium silicate glass and/or ammonium hydroxide.

Further to achieve the foregoing objects in accordance with the purposes of the invention, as embodied and broadly described herein, the invention comprises a receiver which is used for the casting of high energy silicon solar cells.

Additional objects and advantages of the invention will be set forth in part in the description which follows and in part will be obvious from the description, or may be learned from the practice of the invention. The objects and advantages may be realized and attained by means of the instrumentalities and combinations particularly pointed out in the appended claims.

DETAILED DESCRIPTION OF THE PREFERRED EMBODIMENTS

Reference will now be made in detail to the presently preferred embodiments of the invention, which together with the following examples, serve to explain the principles of the invention.

As noted above, the present invention is for a receiver which is formed by first forming a mixture which comprises particulate ceramic powders and a binder. The mixture is then added to a mold disposed to form a board-like member. The mixture is allowed to harden and the hardened mixture is removed from the mold and then the board-like members are heated to reduce their permeability to the molten material and to remove any volatiles which may remain from the binder. The board-like members are then cemented together to form a receiver which is coated with release agents.

Receivers which are used in casting should be impermeable to the casting material. This is particularly important when high purity molten silicon is being casted because molten silicon has a relatively low viscosity that can readily penetrate a porous or permeable receiver. Penetration of silicon into the receiver results in the development of what are called "fins" that are imperfections in the cast silicon which result from molten silicon infiltrating and solidifying in cracks or the like in the receiver.

The formation of fins causes severe problems. Because fins are extensions of the cast article, they hinder separation of the cast article from the receiver. Such fins may also cause the cast article to fracture during cooling by inhibiting stress relieving movement between the receiver and the casting. Commercially available receivers, to date, have been unsatisfactory for the production of silicon solar energy cells because of the limited availability of various shapes and sizes and such receivers do not have the necessary structural qualities. Additional background information explaining the casting of semicrystalline silicon bricks is disclosed in U.S. Pat. No. 4,256,681 to Lindmayer which is hereby incorporated by reference to the extent necessary to facilitate an understanding of the background of the invention.

It has been found that the casting of molten material, and particularly silicon, is greatly facilitated when it is cast in receivers which are constructed from a mixture of particulate ceramics powders and a binder. Receivers constructed in accordance with the present invention have low permeability to molten silicon, high temperature durability, reduced incidents of cracking, and they produce a high quality casting.

Preferred ceramic powders are fused silicas and ground quartzes. Fused silica is preferred because it has a glass transformation or annealing point of 1140° C. and a relatively low coefficient of thermal expansion $(0.6 \times 10^{-6}/C^3)$. Above 1140° C., fused silica is thermoplastic in nature, and this characteristic enables stress to be relieved during casting. Fused silica deforms sufficiently to relieve the stress created by the expansion of the cast material upon cooling.

The low permeability of the receivers made in accordance with the present invention is achieved by the use of particulate ceramic powders which contain a large component of finely ground particles. The sizes of the particulate ceramic powders are formulated to minimize microcracking. Too large a proportion of fine particles will cause microcracking and too large a proportion of coarse particles will produce weak molds. Tables I and II list various mixture formulations.

In a preferred embodiment, the particulate ceramic powders range in U.S. standard mesh size from −50 to −325. The ceramic powders may be ground to various sizes using a blender. For example, blend 1 in Table II comprises one-third of fused silica RG-1 (obtained from Remet Corporation) at mesh size −50, one-third of GP-1lI (obtained from the Harbison-Walker Company) at −200 mesh and one-third by weight of GP-3I (obtained from the Harbison-Walker Company) at −325 mesh. Blend 13 comprises one-third of GP-1lI at −200 mesh, one-third GP-3I at −325 mesh and one-third of quartz 15F (obtained from Pacer Corporation) Nom 200. (Nom 200 signifies that the quartz powders are nominally at 200 mesh.)

In accordance with the invention, the mixture further includes a binder. The binder, in a preferred embodiment, is a liquid ethyl orthosilicate solution sold by Stauffer Chemical Company of Westport, Conn. under the tradename Silbond H-5. The binder reduces the permeability by the formation of inorganic silica polymers and thus prevents the cast material from penetrating into the receiver and forming fins. The ratio of the binder to the ceramic powders can be adjusted to minimize the porosity of the receiver and thus reduce microcracking and increase dimensional stability of the receiver. The preferred ratio of liquid binder to ceramic powder ranges from 0.15 to 0.30 milliliters of binder per 100 grams of ceramic powder.

In accordance with the invention, the mixture may optionally include ground flakes of potassium silicate glass and/or ammonium hydroxide as setting agents. The setting time can be adjusted by varying the amount of potassium silicate, the size of the potassium silicate and the concentration of ammonium hydroxide. Tables I and II list mixture formulations containing potassium silicate glass and/or ammonium hydroxide.

It is important to mix the powders together thoroughly. Proper mixing of the powders will produce a receiver having minimum voids. When receivers made in accordance with the present invention are used in casting, an effective silica bond is formed between the refractory silica particles.

Once the powders and binder are thoroughly mixed, the mixture is added to a mold which is disposed to form a board-like member. The mixture is then allowed to set for several hours in the mold to harden the mixture. After the mixture is hardened it is removed from the mold and the surface of the resulting board-like member is heated to reduce the permeability and remove any volatiles remaining from the binder. In a preferred embodiment the board-like members are heated by applying the flame from a conventional propane torch.

After the boards are heated they are cemented together to form a receiver. A high temperature resistant cement, such as fused silica, is preferably used.

The bulk density of the fused silica board-like members made in accordance with the present invention is about 1.50–1.58 g/cm³. This density is significantly lower than the density of slip cast fused silica receivers which have a bulk density greater than 1.80 g/cm³. The lower bulk density provides a lower thermal conductivity.

A significant advantage of the present invention is that the cast boards can be made in a variety of thicknesses and thus receivers made in accordance with the present invention have great versatility. For example, receivers which have sides which vary in thickness can be made. In this way heat extraction is optimized and this allows the cast material, which is preferably silicon, to crystallize columnarily.

In a preferred embodiment, a receiver was made having an inside dimension of 8.75 inches square and a height of 8 inches. The boards were one inch thick on the bottom and two inches thick on the side. In another embodiment, the boards had a thickness of one inch on the bottom and the walls were one inch thick.

Optionally, receivers made in accordance with the present invention can include chill sites embedded into the receiver walls to further aid or optimize heat extraction.

Once the receivers are assembled they may optionally be coated with an ethyl ortho-silicate solution. In blend 11, in Table II, five coats of silbond H-5 was applied to a receiver and the receiver was then torched. Application of an ethyl orthosilicate solution to constructed receivers further reduces the permeability of the receiver.

Release agents are coated on the assembled receivers to facilitate release of the cast article from the receiver. The release coatings may be applied in a conventional manner such as brushing or spraying. The release agents are solutions containing silicon carbide or silicon nitride. A silicon carbide solution suitable in the present invention is the 500 microgrit silicon carbide solution available from Process Research of Pennington, N.J. Suitable silicon nitrides in the present invention are SN502 sold by GTE-Sylvania Corporation of Tonawanda, N.Y. and LC12 sold by Herman C. Starck Corporation of Berlin, West Germany. Polyvinyl alcohol is used as a solvent for the release coatings. In one embodiment, the release coatings are bound by polyvinyl alcohol and contain equal parts by weight of either silicon carbide or silicon nitride. In another embodiment, the silicon nitride and silicon carbide powders can be mixed with an ammonium stabilized colloidial silica. A suitable colloidial silica is sold under the tradename AS40 by the Dupont Chemical Company of Wilmington, Del. In still yet another embodiment, the release coating comprises equal parts of either silicon nitride or silicon carbide, a fused plasma silica such as Cabosil, obtained from the Cabot Corporation of Boston, Mass. and a colloidial silica.

A suitable silicon carbide release coating has the following composition: 90 g SiC, 60 g of an ammonia stabilized 40% silica sol, and 90 g deionized water.

One suitable silicon nitride release coating has the following composition: 30 g of $Si_3N_4$, 40 g of an ammonia stabilized 40% silica sol, 255 g of deionized water, and 2 g of a plasma produced silica.

In a preferred embodiment, several layers of release coatings are brushed onto the surfaces of the receivers. Each layer of the release coating is applied to form a layer having a thickness ranging from approximately 5 $\mu$m to 200 $\mu$m. Various combinations of release coatings can be used. Table 3 lists various combinations of the release coatings which were tested.

After the receiver is coated with the release agents it is ready to be used in casting. In a preferred embodiment, the receivers are used for casting silicon and casting is carried out under nitrogen. The resulting silicon bricks, cast in the receivers of the present invention, produce ingots having a columnar crystal pattern. The ingots are easily released from the receivers.

TABLE I

| Exp. No. | Component | Mesh Size | Wt. % | NH₄OH 3% Binder[3] Liquid to Powder Ratio | Soln., Vol % of Binder Soln. |
|---|---|---|---|---|---|
| A | Quartz (PGS)[1] | 30/100 | 16.7 | 1/6 | 0.8 |
|  | Quartz (Pacer)[2] | nom 200 | 33.3 |  |  |
|  | Supersil (PGS)[1] | −200 | 16.7 |  |  |
|  | Supersil (PGS) | −325 | 0.01 |  |  |
| B | Quartz (PGS) | 30/100 | 16.5 | 1/6 | 0.06 |
|  | Quartz (Pacer) | nom 200 | 33.0 |  |  |
|  | Supersil (PGS) | −200 | 16.5 |  |  |
|  | Supersil (PGS) | −325 | 33.0 |  |  |
|  | Cabosil (M-5) | — | 0.01 |  |  |
|  | Potassium Silicate | −100 | 1.0 |  |  |
| C | Quartz (PGS) | 30/100 | 16.6 | 1/6 | 1.4 |
|  | Quartz (Pacer) | nom 200 | 33.2 |  |  |
|  | Supersil (PGS) | −200 | 16.6 |  |  |
|  | Supersil (PGS) | −325 | 33.2 |  |  |
|  | Cabosil | — | 0.01 |  |  |
| D | Quartz (PGS) | 30/100 | 16.4 | 1/6 | none |
|  | Quartz (Pacer) | nom 200 | 32.8 |  |  |
|  | Supersil (PGS) | −200 | 16.4 |  |  |
|  | Supersil (PGS) | −325 | 32.9 |  |  |
|  | Cabosil | — | 0.01 |  |  |
|  | Potassium Silicate | −100 | 1.0 |  |  |
|  | Potassium Chloride | 40/60 | 0.5 |  |  |

[1]PGS Corp., Berkley, WV
[2]Pacer Corp., Custer, SD
[3]Silbond H-5, Stauffer Chemical Co., Westport, CT

TABLE II

CASTABLE FUSED SILICA FORMULATIONS
(Silbond H-5 - Ethyl Orthosilicate Binder)

| Designation | Mesh Size | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Fused Silicas | | | | | | | | | | | | | | | | | | |
| GG-10/20 | −10 | | | | | | | | | | | 20 | | | | | | |
| RG-2 | −20 | | | | | | | | | | | | 50 | | | | | |
| GG-2 | −20 | | | | | | 33.3 | 60 | 60 | | | | | 40 | | 30 | | |
| EM-30/50 | −30 | | | | 60 | | | | | | | | | | | | | |
| GG-1 | −40 | | | | | | | | | 60 | 40 | | | | | | | |
| RG-1 | −50 | 33.3 | 60 | 60 | | | | | | | | | | | | 33.3 | | 33.3 |
| GP-2 | −100 | | | | | | 33.3 | 20 | 20 | | | 20 | 20 | | 20 | | | |
| GP-15I | −100 | | | | | | | | | | | | | | | | | 33.3 |
| GP-1 | −170 | | | | | | | | | | | | | | | | | |
| GP-11I | −200 | 33.3 | 20 | 20 | 20 | | | | | | | | | 33.3 | | 33.3 | | |
| GP-7I | −270 | | | | | 50 | | | | 20 | 20 | | | | | | 25 | 23.3 |
| GP-3I | −325 | 33.3 | 20 | 20 | 20 | | 33.3 | 20 | 20 | | | 20 | 20 | 33.3 | 20 | 33.3 | 5 | 10.0 |
| Quartz (Pacer) | nom 200 | | | | | | | 50 | | 20 | 20 | 10 | 20 | 33.3 | 30 | | | 70 |
| Potassium (Silicate Glass) | −100 | 0.36 | — | 0.33 | — | 0.36 | 0.36 | 0.36 | 0.25 | 0.25 | 0.20 | 0.20 | 0.20 | 0.20 | 0.20 | 0.15 | 0.15 | 0.15 |
| NH₄OH | Concentration | | | | | | | NH₄OH IN ml ADDED PER 100 ml LIQUID BINDER | | | | | | | | | | |
| NH₄OH 30% | | 0.05 | — | — | 1.5 | — | — | — | — | — | — | — | — | — | — | — | — | — |
| NH₄OH 3% | | — | 0.5 | — | — | — | — | — | — | — | — | — | — | — | — | — | — | — |
| Liquid Binder to Powder Ratio, ml/100 g | | 0.24 | 0.20 | 0.22 | 0.21 | 0.24 | 0.19 | 0.19 | 0.17 | 0.27 | 0.26 | 0.19 | 0.18 | 0.22 | 0.22 | 0.23 | n.d. | 0.21 |

TABLE III

RELEASE TREATMENTS OF CASTABLE FUSED SILICA BOARDS
COATINGS USED AND NUMBER OF APPLICATIONS

| BLEND # | RUN # | H-5 | (SYL) Si3N4 AS40 | (SYL) Si3N4 PVA | (STK) Si3N4 AS40 | (STK) Si3N4 PVA | Qtz AS40 | Qtz PVA | (SYL) Si3N4 KSil | HIGH PURITY SLIP | SiC AS40 |
|---|---|---|---|---|---|---|---|---|---|---|---|
| #1 | 100 | | 2 | 1 | | | | | | | |
|  | 101 | | | 1 | | | | | | | |
|  | 102 | | | 1 | | | | | | | |
|  | 103 | | | 2 | | | | | | | |
| #4 | 104 | | 1 | 1 | | | | | | | |
|  | 105 | 3 | | | | | | | | | 2 |
|  | 106 | | | | | | | | | | |
| #5 | 107 | | 1 | 2 | | | | | | | |
| #6 | 108 | | 1 | 2 | | | | | | | |
| #7 | 109 | | 1 | 1 | | | | | | | |
| #8 | 110 | | 4 | 1 | | | | | | | |
|  | 111 | | 2 | 1 | | | | | 1 | | |

TABLE III-continued

RELEASE TREATMENTS OF CASTABLE FUSED SILICA BOARDS

|       | 112 | 1 | 1 |   |   |   |
|-------|-----|---|---|---|---|---|
|       | 113 | 2 | 1 |   | 1 |   |
| #10   | 114 |   |   |   |   | 4 |
| #11   | 115 | 2 |   |   |   |   |
|       | 116 | 1 |   |   |   |   |
|       | 117 | 3 | 2 |   |   |   |
|       | 118 | 1 | 1 |   |   |   |
|       | 119 | 4 |   |   |   | 1 |
| #12   | 120 | 5 | 2 | 1 |   |   |
| #13   | 121 |   |   | 2 | 1 |   |
| #14   | 122 |   |   | 2 | 1 |   |
| #15   | 123 |   |   | 2 | 1 |   |
|       | 124 |   |   |   | 1 | 1 |
|       | 125 |   |   | 2 | 1 |   |

COATINGS USED AND NUMBER OF APPLICATIONS

| BLEND # | RUN # | SiC PVA | Qtz AS40 CABOSIL | (STK) AS40 Si3N4 CABOSIL | (SYL) Si3N4 CABOSIL AS40 | SiC CABOSIL AS40 |
|---------|-------|---------|------------------|--------------------------|--------------------------|------------------|
| #1      | 100   |         |                  |                          | 1                        |                  |
|         | 101   |         |                  |                          |                          |                  |
|         | 102   |         |                  |                          | 1                        |                  |
|         | 103   |         |                  |                          |                          |                  |
| #4      | 104   |         |                  |                          |                          |                  |
|         | 105   | 2       |                  |                          |                          | 2                |
|         | 106   |         |                  |                          |                          |                  |
| #5      | 107   |         |                  |                          |                          |                  |
| #6      | 108   |         |                  |                          |                          |                  |
| #7      | 109   |         |                  |                          |                          |                  |
| #8      | 110   |         |                  |                          |                          |                  |
|         | 111   |         |                  |                          |                          |                  |
|         | 112   |         |                  |                          |                          |                  |
|         | 113   |         |                  |                          |                          |                  |
| #10     | 114   |         |                  |                          | 2                        |                  |
| #11     | 115   |         |                  |                          | 2                        |                  |
|         | 116   |         |                  |                          | 2                        |                  |
|         | 117   |         |                  |                          | 2                        |                  |
|         | 118   |         |                  |                          | 2                        |                  |
|         | 119   | 1       |                  |                          |                          | 3                |
| #12     | 120   |         |                  |                          | 3                        |                  |
| #13     | 121   |         |                  | 2                        |                          |                  |
| #14     | 122   |         |                  | 2                        |                          |                  |
| #15     | 123   |         |                  | 2                        |                          |                  |
|         | 124   |         | 3                |                          |                          |                  |
|         | 125   |         |                  | 2                        |                          |                  |

It will be apparent to those skilled in the art that various modifications and variations can be made in the processes and products of the present invention. Thus it is intended that the present invention include modifications and variations of this invention provided they come within the scope of the appended claims and their equivalents.

What is claimed is:

1. A receiver for casting molten material, wherein said receiver is formed by the steps comprising:
   (a) forming a mixture comprising particulate ceramic powders and a binder;
   (b) adding said mixture to a mold disposed to form a board-like member;
   (c) hardening said mixture;
   (d) removing said hardened mixture from said mold;
   (e) heating the surface of said board-like members to reduce their permeability;
   (f) cementing said board-like members together to form a receiver with a temperature resistant cement; and
   (g) coating said receiver with release agents.

2. The receiver of claim 1 wherein said release agent is selected from the group consisting of silicon carbide and silicon nitride.

3. The receiver of claim 1 wherein said receiver is impregnated with an ethyl orthosilicate solution prior to coating said receiver with release agents.

4. The receiver of claim 1 wherein the ratio of binder to ceramic powder in said mixture ranges from 0.15 to 0.30 ml of binder per 100 g of ceramic powder.

5. The receiver of claim 1 wherein said ceramic powders comprise batches of fused silica powders having different U.S. standard mesh sizes, a first batch having a mesh size of −50, a second batch having a mesh size of −200 and a third batch having a mesh size of −325.

6. The receiver of claim 1 wherein said ceramic powders comprise batches of ceramic powders having different U.S. standard mesh sizes, a first batch being fused silica having a mesh size of −200, a second batch being fused silica having a mesh size of −325 and a third being quartz having a nominal mesh size of 200.

7. The receiver of claim 1 wherein said ceramic powders comprise batches of fused silica powders having different U.S. standard mesh sizes, a first batch having a mesh size of −40, a second batch having a mesh size of −200 and a third batch having a mesh size of −325.

8. The receiver of claim 1 wherein said binder is a liquid solution of ethyl orthosilicate.

9. The receiver of claim 1 wherein said mixture further includes a setting agent selected from the group consisting of potassium silicate glass and ammonium hydroxide.

10. The receiver of claim 1 wherein said mixture comprises:

approximately 25%-50% by weight of −50 mesh fused silica powder, approximately 25%-50% by weight of −200 mesh, fused silica powder approximately 25%-50% by weight of −325 mesh, fused silica powder approximately 0 to 3% by weight of potassium silicate glass;

a liquid ethyl orthosilicate binder; wherein the ratio of ethyl orthosilicate to ceramic powder ranges from 0.20 to 0.30 ml of binder per 100 g of powder.

11. A receiver for casting silicon which is used in the manufacture of solar energy cells, wherein said receiver is formed by the steps comprising:

(a) forming a mixture comprising particulate ceramic powders and a liquid ethyl orthosilicate binder;

(b) adding said mixture to a mold disposed to form a board-like member;

(c) hardening said mixture;

(d) removing said hardened mixture from said molds;

(e) torching the surface of said board-like members to reduce their permeability to the material being casted;

(f) cementing said board-like members together to form a receiver with a fused silica cement; and (g) coating said receiver with release agents.

12. The receiver of claim 1 wherein said receiver is constructed of board-like members which vary in thickness.

13. The receiver of claim 1 wherein said release coating comprises a solution of silicon nitride, silica sol, plasma produced silica and water.

14. The receiver of claim 1 wherein said release coating comprises a solution of silicon carbide, silica sol, plasma produced silica and water.

15. The receiver of claim 1 wherein said temperature resistant cement is a high purity fused silica cement.

* * * * *